United States Patent [19]

McGroddy et al.

[11] 4,117,497

[45] Sep. 26, 1978

[54] PRINTING AND DISPLAYING TECHNOLOGY USING SELECTIVE LASER BEAM PRICKING OF LIQUID FILM FOR WRITING INFORMATION

[75] Inventors: James Cleary McGroddy, Putnam Valley, N.Y.; James Alden Van Vechten, Basking Ridge, N.J.

[73] Assignee: International Business Machines Corporation, Armonk, N.Y.

[21] Appl. No.: 734,578

[22] Filed: Oct. 21, 1976

[51] Int. Cl.[2] .............................................. G01D 15/14

[52] U.S. Cl. ...................................... 346/17; 101/122; 101/128.4; 346/21; 346/76 L; 358/297

[58] Field of Search ................... 346/17, 21, 76 L, 77; 358/297, 296; 101/122, 128.4

[56] References Cited

U.S. PATENT DOCUMENTS

| | | | |
|---|---|---|---|
| 2,384,515 | 9/1945 | Wise | 346/21 |
| 3,461,229 | 8/1969 | Oppenheimer | 358/297 X |
| 3,600,834 | 8/1971 | Stamer | 346/21 X |
| 3,696,742 | 10/1972 | Parts | 101/128.4 |
| 3,780,214 | 12/1973 | Bestenreiner | 346/76 L X |
| 3,796,365 | 3/1974 | Browning | 346/76 L X |
| 3,864,697 | 2/1975 | Dillon | 354/5 |

*Primary Examiner*—Joseph W. Hartary
*Attorney, Agent, or Firm*—Bernard N. Wiener

[57] ABSTRACT

This disclosure obtains printing and displaying of information stored as a pattern of orifices in a colored liquid film established on the interstices of a screen-mesh member. A laser beam is used to effect removal of the film at each selected interstice either by puncturing the film thereat or vaporizing a portion thereof so that reactive surface tension force displaces the remainder of the film. The screen is moved in coordination with the writing thereon of the information pattern so that the area upon which the information is established may be presented sequentially to a displaying station and to a printing station. At the displaying station, light is either transmitted through the orifices established in the colored liquid film or is reflected from the film left in the unwritten interstices onto a display screen as a pattern of information either as a positive or a negative image of the actual information content established in the screen-mesh. The information written in the film on the screen-mesh may then be conveniently printed by technology of aerosol-mist via the orifices established at the interstices. Alternatively, the information written onto the screen-mesh via the films may be printed directly therefrom by the laser beam. Finally, both the displaying and the printing may be accomplished at the same station as the writing by a convenient arrangement of displaying screen and printing mechanism.

12 Claims, 5 Drawing Figures

PRINTING AND DISPLAYING TECHNOLOGY USING SELECTIVE LASER BEAM PRICKING OF LIQUID FILM FOR WRITING INFORMATION

BACKGROUND OF THE INVENTION

Several background developments in the prior art literature from which the present invention is distinguishable are described below:

1. D. H. Woodard in IBM Technical Disclosure Bulletin, page 1592, Vol. 9, No. 11, Apr. 1976, describes technology for non-impact printing by laser light through evaporation selectively of coated material layer from a light absorbing layer on a substrate. They together comprise a web upon which the laser light impinges. The coated material first evaporates and then condenses on an adjacent copy paper which can be developed with toner particles or some other developing technique.

2. W. T. Levine in IBM Technical Disclosure Bulletin, Vol. 15, No. 2, July 1972, page 367, describes a printer technology in which a nylon fabric tape in an endless loop is impregnated with a chemical which is electrochemically color reversible. Writing and referencing electrodes accomplish dot matrix information printing.

3. D. D. Roshon, Jr. et al in U.S. Pat. No. 3,293,662 issued Dec. 20, 1966 describes selective piercing of a paper sheet material by laser beam by volatilizing, burning or destroying for storage of an information pattern of holes at specified locations. Ink spots are established at the specified locations on the sheet material on the surface which is disposed opposite to the surface upon which the laser beam impinges.

4. H. Angel in U.S. Pat. No. 2,350,382 issued June 6, 1944 describes passing of a perforated tape through a liquid bath of some plasticlike or waxlike material for filling the perforations therewith. Selected ones of the filled holes are punched out or otherwise removed in accordance with a pattern of signals to be stored as holes in the tape.

5. D. L. Roberts in U.S. Pat. No. 3,787,210 issued Jan. 22, 1974, describes recording of an image as record of machine or human readable characters on a film with a laser beam by removing a coating on a substrate by blow-off or explosion at selected locations through focusing the laser beam to the interface from the substrate side.

6. R. J. Wise in U.S. Pat. No. 2,384,515 issued Sept. 11, 1945 describes apparatus for recording the information content of electrical signals on a moving endless web belt. A reticulated or perforated web is provided which has small closely spaced interstices capable of sustaining a film of a liquid thereacross which is picked up at a bath of liquid in a receptacle. The recording web-belt is in the form of a fine mesh-screen made of woven wire, or of pierced metal or of cloth. The liquid is selectively removed from the interstices in elemental areas of the medium. The film forming liquid may be colored in order that distinctive pattern may be formed on the medium by the selective removal of the liquid therefrom. This removal may be effected mechanically, as by an air blast, or electrically, as by a suitable electrically charged stylus moving relative to the surface.

The record information may be projected upon a screen as a visible image by means of any suitable projector.

OBJECTS OF THE INVENTION

It is an object of this invention to provide technology for utilizing laser beam energy to obtain information storage for readout as a visual display or as a visual print by selectively applying the energetic photons from a laser beam source to disperse the liquid film established at interstices of a web or screen-mesh member.

It is another object of this invention to effect dispersal of liquid films established at interstices of a web-like member by selective absorption of laser beam photons.

It is another object of this invention to provide apparatus for writing, displaying and printing information which utilizes the selective local removal of liquid films at interstices on a screen-mesh by means of absorption of laser beam photon energies.

It is another object of this invention to utilize laser beam photons for selectively energizing a droplet of ink on a surface thereof such that vaporization of the liquid causes the droplet to be propelled selectively toward a target area through reaction force.

SUMMARY OF THE INVENTION

Selective writing, displaying and printing dynamically of information is achieved through the practice of this invention by energetically dispersing by laser beam liquid films located in the interstices of a webbed member, thereafter displaying the information by projecting light via the orifices so created, and thereafter printing a composite of the information so written by projecting selectively ink via the orifices so created.

The practice of this invention accommodates the use of the energetic photons of one or more laser beams for selectively dispersing liquid films located at the interstices of a webbed matrix for storing information with subsequent displaying and printing of the information so written in the film. Orifices are selectively obtained at particular interstices. A source of laser beam energy is located in communicating relationship with a movable screen-belt. The interstices thereof are spatially and temporally coordinated relative to the writing, displaying and printing stations.

The character of the liquid and the contour of the periphery of the interstice is characterized so that the photon energy of the laser beam is absorbed rapidly to effect the dispersal of the entire liquid within the interstice.

Under one circumstance, the force of adhesion of the liquid to the web or screen material is greater than the force of cohesion of the ink to itself and the film is then relatively thin in the interstices of the web. Characteristically, the energetic photons of the laser beam effect vaporization of a small fraction of the volume of the liquid in an interstice, allowing the surface tension forces to completely remove the film from the selected interstice.

Under another circumstance, the liquid film is relatively thick in each of the filled interstices of the web because the force of cohesion of the liquid to itself is greater than the force of its adhesion to the material of the web. Consequently, when the energetic photons of the laser beam are absorbed at the incident surface of the liquid film, the vaporizations of molecules therefrom effect the expulsion via Newtonian reactive force of the remainder of the liquid in the interstice. If the liquid film is ink in accordance with the principles of this invention, the expelled liquid drop may itself be used for printing the information stored thereby as a direct consequence of the impinging laser beam energy.

An integral element of a particular embodiment of this invention includes a display station at which the perforations which have been exposed by laser beam energy in the liquid films maintained by the web provide the pattern of orifices by which the written information may be displayed upon its screen. Further, a printing station is included as another integral element of another particular embodiment of this invention, at which either ink is patterned upon a receptive vehicle via the orifices, or appropriate physical mechanisms are utilized to print the pattern of liquid films from the interstices at which they have not been disturbed; this includes ink drop ejection by laser beam.

EMBODIMENT OF THE INVENTION

Figures 1A, 1B:
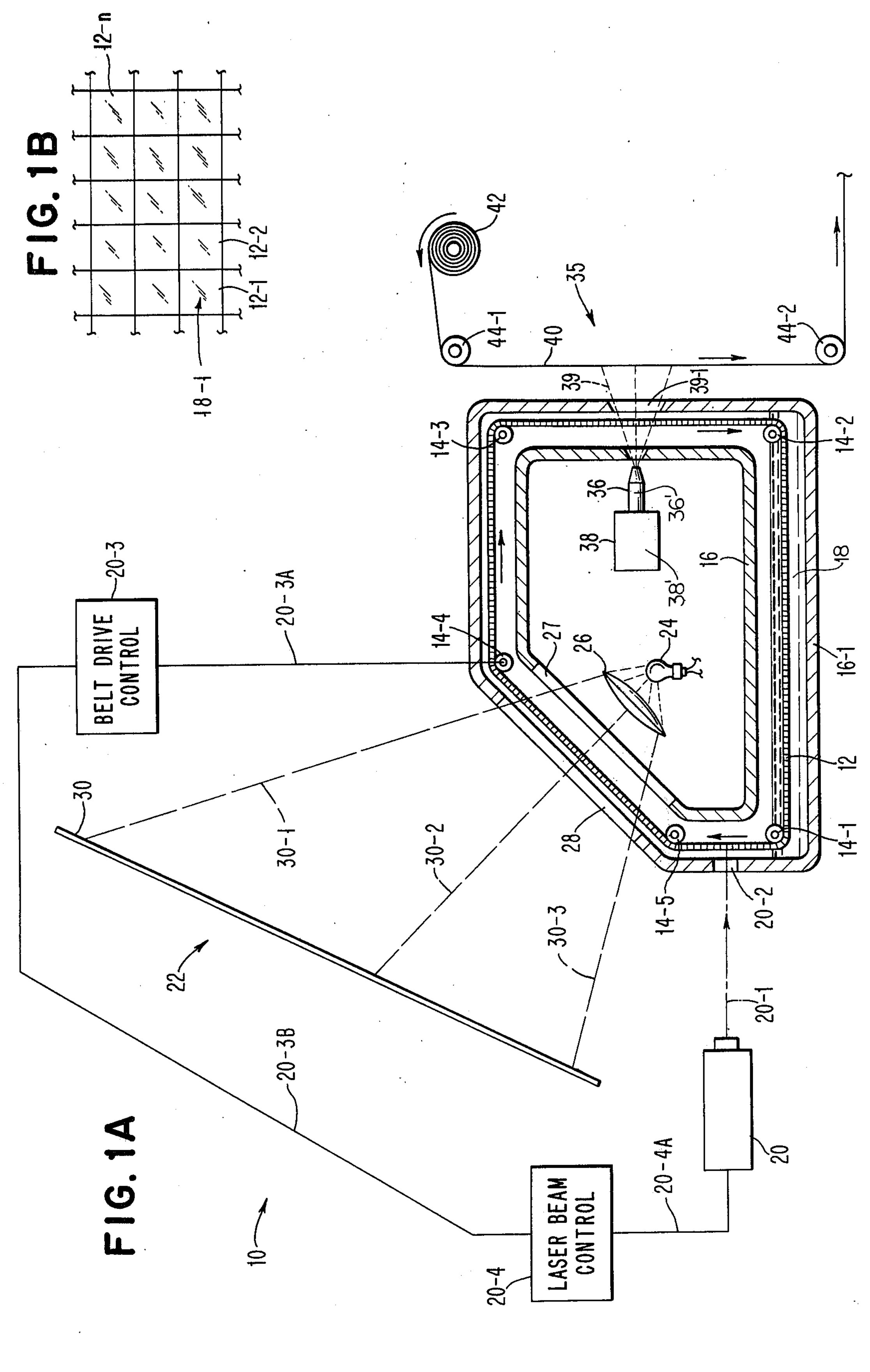
FIG. 1A is a schematic illustration of a system for practice of this invention showing a laser beam writing station, a projective displaying station and a non-impact printing station.
FIG. 1B is a representation of the mesh-belt of FIG. 1A with all interstices being filled with liquid prior to selective removal as a pattern of orifices by laser beam energy.

An exemplary embodiment of this invention is illustrated in FIG. 1A by a schematic diagram of a physical arrangement wherein writing, displaying and printing operations are achieved. The embodiment 10 of FIG. 1A comprises an endless screen belt 12 which is moved in a continuous path in chamber 16 defined by receptacle or chamber 16-1 by driving and guiding rollers 14-1, 14-2, . . . 14-5. Belt 12 passes through a reservoir of ink 18 which is established in the lower portion of the chamber 16-1 through which the sceen belt 12 passes to pick up ink films in the interstices of the screen shown diagrammatically in FIG. 1B as an enlarged portion of the screen belt 12 with ink in interstices 12-1, 12-2, . . . 12-*n*. At the writing station, laser 20 provides laser beam 20-1 to the belt 12 via window 20-2. The laser 20 is operated or programmed to provide the laser beam energy in coordination with the passage of interstices 12-1, 12-2, . . . 12-*n* in the screen 12 by window 20-2.

In the diagram of FIG. 1, the laser 20 is positioned to write a line of information sequentially in the screen 12. Alternatively, the laser 20 may be programmed as a beam scanner taken together with a modulator such that any pattern upon any discrete area of the screen-mesh 12 including several interstices may be written in accordance with a programmed procedure. The program of the laser 20 is accomplished in coordination with the drive control 20-3 via connection 20-3A for the screen belt 12 and in electrical synchronization via connection 20-3B with the beam control 20-4 for the laser 20 via connection 20-4A.

The ink films such as 18-1 etc. at an interstice such as 12-1 etc. of screen belt 12 may be removed therefrom according to either of two modes of operation. In one mode of operation, the ink film is thin in the interstice because it adheres more strongly to the screen than to itself. Consequently, the physical mechanism by which the film thereat is removed is via pricking or puncturing of the film by the laser beam and the subsequent diminution of the film in the interstice because of its own internal stress pattern.

In another mode of operation, oblate drops are driven from the screen interstices by laser pulses. This is accomplished either to transfer ink to paper or to open an orifice to pass light or ink mist. In this mode, ink and screen material should be chosen so that the ink adheres itself better than to the screen. Thus, the film is thicker in the central portion of a interstice than at the edge where it is retained by the screen. Further, laser and liquid characteristics should be chosen such that laser light is absorbed in as short a distance of penetration as possible within the ink film.

The presentation of the written information to the display station 22 is coordinated according to the writing procedure and the requirement for display. For continuous writing by the laser beam sufficiently rapid that the screen belt is moved continuously and at a given speed, the written area is presented to the display station 22 and is projected by lamp 24 via lens 26 through windows 27 and 28 in chamber 16 and chamber 16-1 to screen 30 as exemplary light rays 30-1, 30-2 and 30-3. If the film is somewhat less than completely transparent, the image projected consists essentially of the dark and light regions of the screen corresponding to the unpricked and pricked interstices respectively. This produces white letters on black background. Alternatively, by suitable arrangement of the programming of the writing station, dark characters in a light background can be produced.

The printing station 35 of the embodiment shown in FIG. 1A comprises an ink-mist stream 36 with associated circuitry and mechanism 38 which produces the ink pattern on moving paper 40 from roll 42 as driven and guided by rollers 44-1 and 44-2. The ink-mist stream 39 is presented to paper 40 through window 39-1 in the chamber 16 via the written area of the belt 12. The paper moves synchronously or in a controlled manner with the presentation of the ink to the paper. The written mesh serves as a stencil for the printing, since the ink mist stream reaches the paper only via those interstices which have been opened. Alternatively, device 36′ (also number 36) comprises a laser beam source and device 39′ (also number 38) comprises circuitry and mechanism for causing the ink remaining on the screen mesh to be transferred to the paper 40 by reactive force.

CONSIDERATIONS FOR THE INVENTION

Practice of this invention obtains a novel printing and display technology which can be implemented at low cost, for low energy consumption, and by simple construction.

The technology includes a screen belt which is continuous and moves over guide and drive rollers through an ink bath in the lower portion of a chamber. The screen belt is in the form of a mesh and after passing through the bath each hole or interstice is covered with a film of ink. The mesh size for a display-oriented utilization is desirably about 5 mils square. However, it can be smaller for high quality printing.

The laser device evaporates selectively liquid from the screen to produce a hole of about a few microns in diameter somewhere in the selected interstice of the mesh. The pricking of the film evaporates a spot of an interstice in the center with minimal linear dimensions. Surface tension then opens the entire interstice.

As the information is put on the belt by selectively opening the mesh points, the screen belt is rolled along to a station where the image is projected to a display screen for viewing of an image of the selected area of the screen belt which may conveniently be 1:1 in size.

Figure 2:
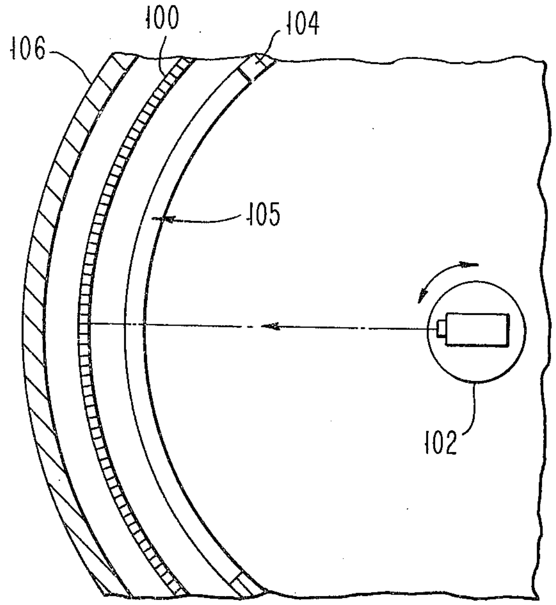
FIG. 2 shows schematically local deformation of the mesh-belt into a cylindrical shape so that a laser light source and associated focussing optics can be scanned across the belt by a simple rotary motion thereby maintaining the focal point constantly on the belt as the beam is scanned.

Several simple means are available to provide for scanning the laser spots over the mesh at the writing station. A single laser source and associated focussing optics may be employed as exemplified by the illustration of FIG. 2 which shows schematically how the mesh belt 100 may be locally deformed into a cylindrical shape so that a laser light source and associated focussing optics can be scanned across the belt by a simple rotary motion, maintaining the focal point constantly on the belt as the beam is scanned. The writing station may include a plurality of laser beam sources focused on a cylindrical surface for establishing a pattern of orifices in the liquid films of a mesh-belt deformed partially as a cylinder. FIG. 2 includes the wall 104 and window 105 therein of the structure which houses the laser beam source 102. The structure 106 is the wall of the chamber which holds the ink supply. The screen 100 is locally deformed into a circular arc so that the light spot remains in focus as it scans across the screen, being modulated in synchronism with the motion of the light spot across the inked interstices in mesh-belt 100.

An alternative to the deformation of the screen is the use of a linear fiber optic array, the source ends of the fibers being arrayed in a circular arc and the emitting ends of the fibers being arrayed in a straitht line and imaged on the interstices.

Figure 3A:
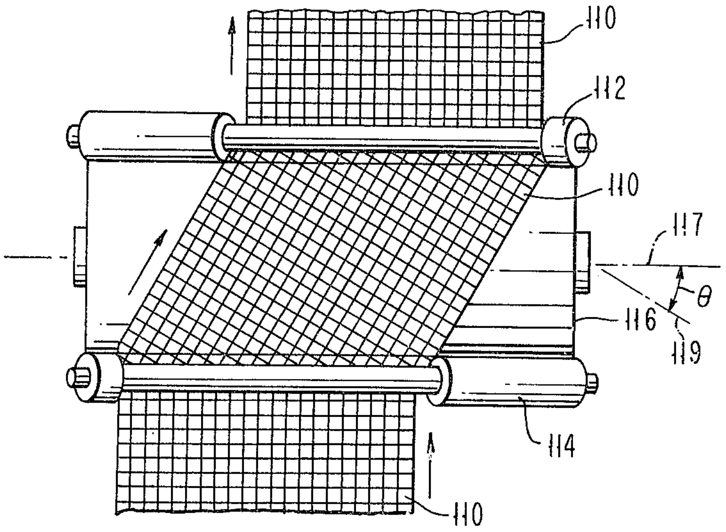
FIGS. 3A and 3B show two views schematically of how the writing station can be established to scan the belt with a plurality of lasers which are rotated about an axis which is not normal to the belt motion direction.
Figure 3B:
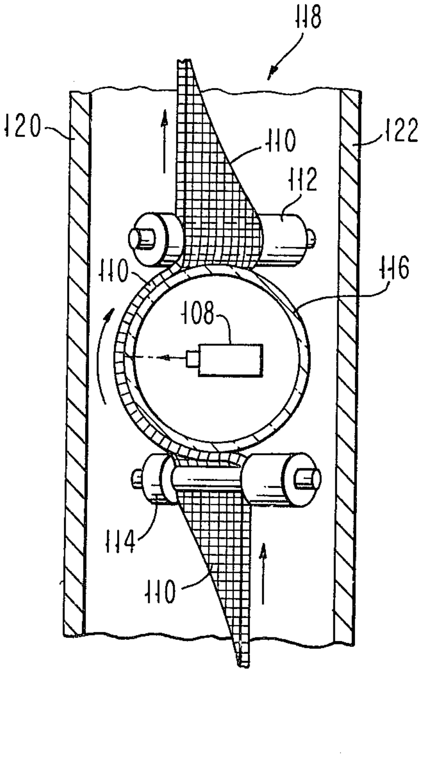

In a second means of writing, a plurality of lasers is used as exemplified by FIGS. 3A and 3B.

Thus, FIG. 3 shows schematically how the writing station can be established to scan the belt with a plurality of lasers, of which laser 108 is exemplary, which are rotated about on axis which is not normal to the belt motion direction. Belt 110 is driven and controlled by rollers 112 and 114 and is rolled on drum 116. The entire assembly of FIG. 3A is shown housed within housing 118 of FIG. 3B with walls 120 and 122. In this manner the number of lasers needed for scanning is far smaller than the number of interstices across a single line. This arrangement is particularly suited to the use of semiconductor or other minature solid state laser sources. Thus, the lasers 108 are arrayed within a cylindrical roller 116 whose axis 117 is arranged at some angle differing from the perpendicular 119 to the motion of the belt 116 in relationship thereto. Rapid rotation causes the individual lasers to scan diagonal lines in the screen. By suitable adjustment of the rotation between the rotation rate of the cylinder 116 and the rate of screen 110 motion it is possible for example to write completely a screen with 1000 interstices across its width with a set of 20 to 50 individual lasers 108.

Putting the character information on the screen requires only a small amount of energy because it is only necessary to break a small hole through the liquid film at the center portion of any mesh interstice and surface tension does the rest of the work. If a 1 micron hole needs to be pricked to break a mesh square film open, the energy requirement would be of order $10^{-9}$ joules/-spot for display or printing, i.e., a high quality display with $10^6$ spots reguires energy of order $10^{-3}$ joules to write.

The two modes of removing an ink film from an interstice of a belt are described hereinbelow in greater detail. In one mode of removing liquid from an interstice, it may be vaporized from the focus of the laser beam somewhere in an intended orifice of the screen. In this mode, the ink and screen materials should be chosen such that the ink adheres to the screen more strongly than to itself so that the ink film is thin in the interstice of the screen. Typically, such a film would be of order $10^{-4}$ cm thick and the laser would be focused to a spot of order $10^{-4}$ cm in diameter. Thus, the volume of ink to be vaporized would be of order $10^{-12}$ cm$^3$. As the heat of vaporization of inks are typically of the order $10^3$ joules/cm$^3$, the laser energy required to open the interstice to an orifice is of the order $10^{-9}$ joules. Thus a 0.1 watt laser could open $10^8$ orifices per second, which is sufficient to produce a $5\times10^6$ point display in 1/20 sec. In this mode of operation, the absorption length of the laser beam should be approximately equal to the thickness of the film.

For some liquids for this first mode of operation it is not necessary to supply as much energy as is necessary to evaporate the small volume of ink. Rather, heating the liquid sufficiently in a small region will cause the film to be pierced, thus opening the entire interstice. The liquid may be chosen such that the surface tension decreases rapidly with rising temperature so that absorption of the laser light will cause a local weakening of the film sufficient so that it ruptures under the action of the surface tension of the remainder of the film.

In another mode of removing liquid from an interstice, oblate drops are driven from the screen interstices by laser pulses in order either to transfer ink to paper or to open an orifice to pass light or ink mist. In this mode, ink and screen material should be chosen so that the ink adheres to itself better than to the screen so that film is thick in the interstice. Laser and liquid should be chosen such that laser light is absorbed in as short a distance as possible within the ink film. In this mode, the laser light is all absorbed at one side of the ink film. The reactive force of the vaporizing molecules of the ink act against the remaining drop. When this force exceeds the force of the liquid surface tension to the screen material, which tends to hold the drop in the center of the orifice, the drop is driven out of the orifice and separated from the screen. It is then flys freely across space and impacts at either the paper to be printed or at a gutter to return it to the ink reservoir. As the force on the ink film can be biased by a pressure differential between the two sides of the screen, the laser energy required to displace the drop can, in principle, be made arbitrarily small. In practice, a minimum of about $10^{-9}$ joules/drop is to be used in order to avoid accidental displacement of drops.

The written screen is moved into the displaying area for projection display of the information contained in the pattern of open and closed interstices.

Two alternatives are available for the printing of the stored information. If the information has been written for the display "white on black", i.e., by pricking areas to produce bright characters in projection, then "black on white" printing can be accomplished by passing an aerosol or mist of ink through the opened holes onto the paper, which is moving synchronously with the screen belt past the printing station. Alternatively, if the information has been written "black on white" for display, by a suitable combination of electric and magnetic fields and pneumatic pressure, the ink can be transferred to the paper at the printing station only from those mesh interstices where the film was not pricked.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for writing, displaying and printing an information pattern comprising,

- a laser beam source;
- means for programmably controlling both the scan and power of said laser beam;
- an endless belt screen mesh with a plurality of interstices in a regular geometric format;
- chamber means for containing a source of liquid ink susceptible of forming stable films therefrom on said interstices;
- said screen material and said liquid material being interrelated such that either said liquid adheres more strongly to said screen mesh than it coheres to itself or said liquid coheres more strongly to itself than it adheres to said screen material;
- means for driving said screen mesh through a portion of said liquid;
- means for controlling the positioning of said screen mesh with said liquid in said interstices in communicating relationship with said laser beam and for removing directly and selectively a pattern of said films in said interstices by said laser beam to form orifices thereat respectively as said information pattern;
- a displaying station for said stored information; and
- a printing station for said stored information including means for projecting ink onto a collector medium surface.

2. Apparatus as set forth in claim 1 wherein said liquid adheres more strongly to said screen mesh than it coheres to itself.

3. Apparatus as set forth in claim 2 wherein said laser beam is focused to penetrate said films in said interstices whereby the film thereat are pierced and hydrodynamic force causes said films to be removed from said selected interstices.

4. Apparatus as set forth in claim 1 wherein said liquid coheres more strongly to itself than it adheres to the mesh.

5. Apparatus as set forth in claim 4 wherein said laser beam is focused partially into the thickness of said film and reactive force of vaporization of said liquid effects removal of said films from said selected interstices.

6. Apparatus as set forth in claim 1 wherein said laser beam scans for writing a pattern of information in said screen mesh a line at a time and the movement of the screen mesh is synchronized with the physical movement of said screen mesh past said writing station.

7. Apparatus as set forth in claim 1 wherein said laser beam writes an areal pattern of information in said screen mesh and the areal pattern is moved to said displaying station thereafter.

8. Apparatus as set forth in claim 1 wherein said displaying station comprises a light source means for projecting light via said orifices in said screen mesh onto a screen so as to replicate thereon an image of the remaining said liquid filled interstices of said areal pattern.

9. Apparatus as set forth in claim 8 wherein said printing station comprises means for projecting ink through said orifices to a collector medium surface.

10. Apparatus as set forth in claim 9 wherein said printing station includes an aerosol mist source means for projecting said ink onto said medium.

11. Apparatus as set forth in claim 1 wherein said printing station includes an aerosol mist means for accomplishing said projecting of said ink onto said medium surface.

12. Apparatus as set forth in claim 1 wherein said liquid in said interstices is ink and said printing station includes means for projecting said ink in said remaining filled interstices after said writing of said pattern of orifices onto a surface collector medium.

* * * * *